United States Patent
Okano et al.

(10) Patent No.: US 9,644,741 B2
(45) Date of Patent: May 9, 2017

(54) METAL GASKET

(75) Inventors: Takashi Okano, Commerce Township, MI (US); Steven Honkala, Wolverine Lake, MI (US); Hubert Koehler, Betzdorf (DE)

(73) Assignee: Federal-Mogul LLC, Southfield, MI (US)

( * ) Notice: Subject to any disclaimer, the term of this patent is extended or adjusted under 35 U.S.C. 154(b) by 577 days.

(21) Appl. No.: 13/488,805

(22) Filed: Jun. 5, 2012

(65) Prior Publication Data

US 2013/0320630 A1    Dec. 5, 2013

Related U.S. Application Data

(60) Provisional application No. 61/654,435, filed on Jun. 1, 2012.

(51) Int. Cl.
*F16J 15/08* (2006.01)

(52) U.S. Cl.
CPC .... *F16J 15/0825* (2013.01); *F16J 2015/0856* (2013.01); *F16J 2015/0862* (2013.01); *F16J 2015/0875* (2013.01)

(58) Field of Classification Search
CPC ................. F16J 15/0818; F16J 15/0825; F16J 2015/085; F16J 2015/0856; F16J 2015/0862; F16J 2015/0868
USPC ................................................ 277/590–598
See application file for complete search history.

(56) References Cited

U.S. PATENT DOCUMENTS

| | | | |
|---|---|---|---|
| 5,277,434 A | 1/1994 | Kestly et al. | |
| 5,431,418 A | 7/1995 | Hagiwara et al. | |
| 6,796,562 B2 | 9/2004 | Stapel | |
| 2005/0189724 A1 | 9/2005 | Schmitz | |
| 2007/0090608 A1* | 4/2007 | Ueta | 277/593 |
| 2008/0023922 A1 | 1/2008 | Umehara | |
| 2008/0042371 A1* | 2/2008 | Flemming | 277/593 |
| 2008/0093808 A1* | 4/2008 | Quick et al. | 277/595 |
| 2011/0192369 A1 | 8/2011 | Schmitz | |

FOREIGN PATENT DOCUMENTS

| | | |
|---|---|---|
| JP | H06207672 A | 7/1994 |
| JP | H0741140 U | 7/1995 |
| JP | 2007139177 A | 6/2007 |
| JP | 2008520917 A | 6/2008 |

* cited by examiner

*Primary Examiner* — Gilbert Lee
(74) *Attorney, Agent, or Firm* — Robert L. Stearns; Dickinson Wright, PLLC

(57) ABSTRACT

A gasket assembly is provided including a first gasket layer and a second gasket layer having an outboard region and an inboard edge circumscribing an aperture. The gasket layers present a sealing bead between the inboard edge and the outboard region. A stopper layer disposed between the gasket layers is attached to the outboard region of the first gasket layer at an attachment joint and extends from the attachment joint to the inboard edge. A coating of sealing material is applied between the first gasket layer and the stopper layer. The coating extends from the attachment joint to the inboard edge of the first gasket layer to present a contact region immediately surrounding the aperture where the first gasket layer and the stopper layer are in direct continuous contact with the coating thereby preventing gas leakage and metal to metal contact between the first gasket layer and the stopper layer.

12 Claims, 2 Drawing Sheets

METAL GASKET

CROSS REFERENCE TO RELATED APPLICATION

This application claims the benefit of U.S. Provisional Application Ser. No. 61/654,435, filed Jun. 1, 2012.

BACKGROUND OF THE INVENTION

1. Field of the Invention

The subject invention relates generally to multi-layered metal gaskets for use in internal combustion engines.

2. Related Art

Multi-layered steel gaskets are traditionally used to form a seal between two mating components of a mechanical system or device, such as an internal combustion engine, to prevent leakage of combustion gases, cooling water, lubricating oil, or the like. Common applications involve placing a multi-layered steel gasket assembly between the engine block and cylinder head and between the engine block and exhaust manifold. Cylinder head gaskets typically extend around the cylinder bores of an engine to seal high-pressure combustion gases within the cylinder bores as well as seal oil and coolant passages. Exhaust manifold gaskets typically extend around the exhaust ports of an engine to seal high temperature exhaust gases flowing into the exhaust system. Once installed, the multi-layered steel gasket assembly bears the load from a bolted connection of the engine components and relies upon this load to provide an adequate seal therebetween.

Such prior art multi-layered steel gaskets typically have a plurality of steel gasket layers stacked in relation to one another including at least a first gasket layer and a second gasket layer. The first gasket layer and second gasket layer each have an inboard edge defining at least one aperture to be sealed. Each gasket layer also presents an outboard region radially spaced from the aperture. In cylinder head gasket applications, the aperture typically corresponds with cylinder bores of the internal combustion engine. Alternatively, in exhaust manifold gasket applications, the aperture typically corresponds with exhaust ports of the internal combustion engine. The gasket layers define at least one sealing bead between the inboard edge and the outboard region to provide an area of increase gasket thickness for greater sealing capability. Typically, the sealing bead extends annularly about each aperture.

Some of the prior art multi-layered gaskets further include a stopper layer disposed between the gasket layers. In accordance with U.S. patent application Ser. No. 11/812,113 to Umehara, the stopper layer may be welded to the outboard region of the first gasket layer at a weld joint. In accordance with U.S. Pat. No. 5,277,434 to Kestly et al., the stopper layer may extend from the outboard region of the gasket layers to the inboard edge of the gasket layers. At least one coating of sealing material may be applied between the gasket layers such that the coating is substantially coextensive with the plurality of gasket layers. Despite the presence of the coating, small combustion gas leaks can develop between the gasket layers and the stopper layer. This problem can occur because the stopper layer and the gasket layers do not directly contact the coating in the area immediately surrounding the apertures.

SUMMARY OF THE INVENTION

A gasket assembly has a plurality of metal gasket layers including at least a first gasket layer and a second gasket layer each having an inboard edge circumscribing at least one aperture to be sealed and an outboard region radially spaced from the aperture. At least one sealing bead is disposed along at least one of the gasket layers between the inboard edge and the outboard region. A stopper layer is disposed between the gasket layers and attached to the outboard region of the first gasket layer at an attachment joint wherein the stopper layer extends from the attachment joint to the inboard edge of the gasket layers. A coating of sealing material is applied between the first gasket layer and the stopper layer. The coating extends from the inboard edge of the first gasket layer to present a contact region adjacent to and immediately surrounding the aperture defined by the first gasket layer. The stopper layer is in direct continuous contact with the coating applied therebetween for preventing gas leakage between the first gasket layer and the stopper layer and for preventing metal to metal contact between the first gasket layer and the stopper layer in the region of the coating.

Such a gasket is advantageous in that the coating is sandwiched between the first gasket layer and the stopper layer in a contact area immediately surrounding the aperture and is thus free of gaps, voids, or pockets between the coating and the first gasket layer and the coating and the stopper layer that would otherwise allow for possible fluid leakage. Accordingly, such a gasket assembly has improved service life and sealing performance compared to prior known gaskets of this general type because of the specific configuration of the contact region that eliminates gas leaks between the first gasket layer and the stopper layer.

BRIEF DESCRIPTION OF THE DRAWINGS

These and other advantages and features of the subject invention will be readily appreciated, as the same becomes better understood by reference to the following detailed description when considered in connection with the accompanying drawings, wherein.

DETAILED DESCRIPTION

Referring to the Figures, wherein like numerals indicate corresponding parts throughout the several views, a gasket assembly for providing sealing between an engine block and a cylinder head of an internal combustion engine is presented.

Figure 1:
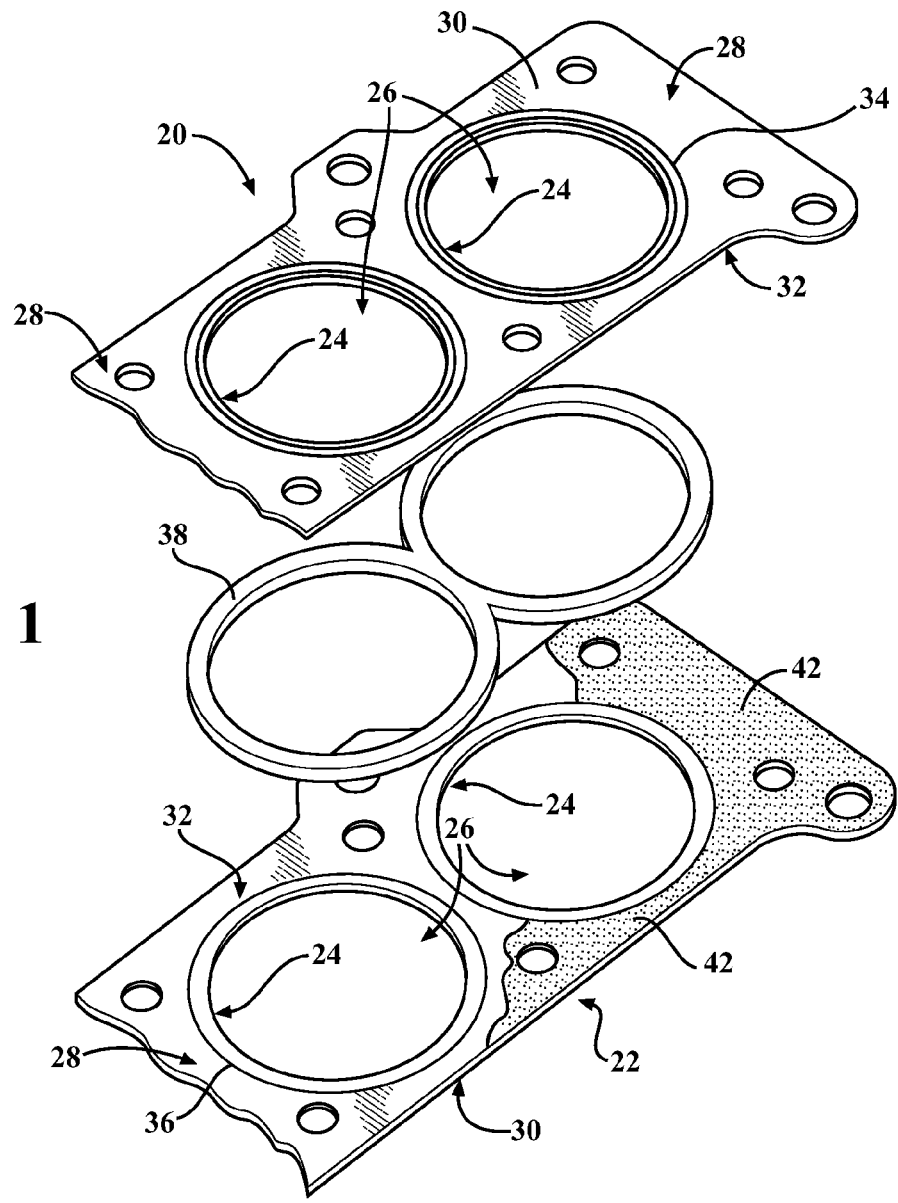
FIG. 1 is an exploded fragmentary perspective view of an exemplary multi-layered gasket assembly.
Figure 2:
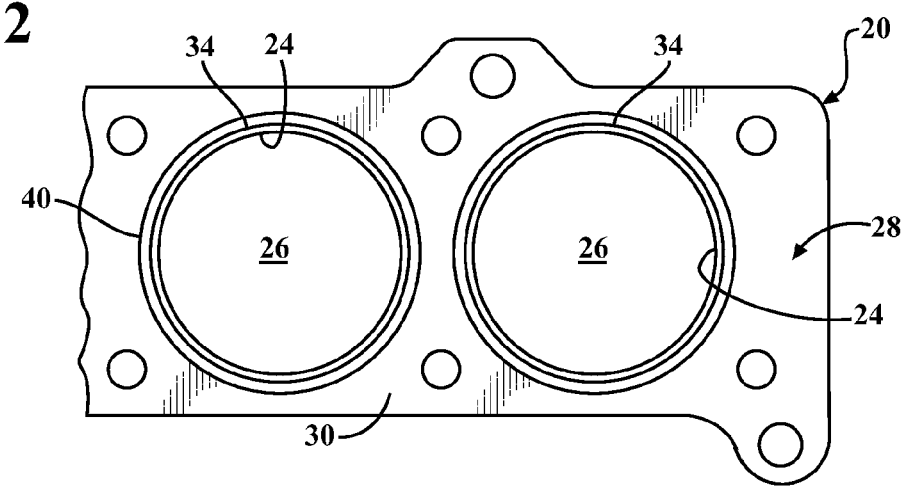
FIG. 2 is a fragmentary top elevation view of the first gasket layer of the exemplary multi-layered gasket assembly.
Figure 3:
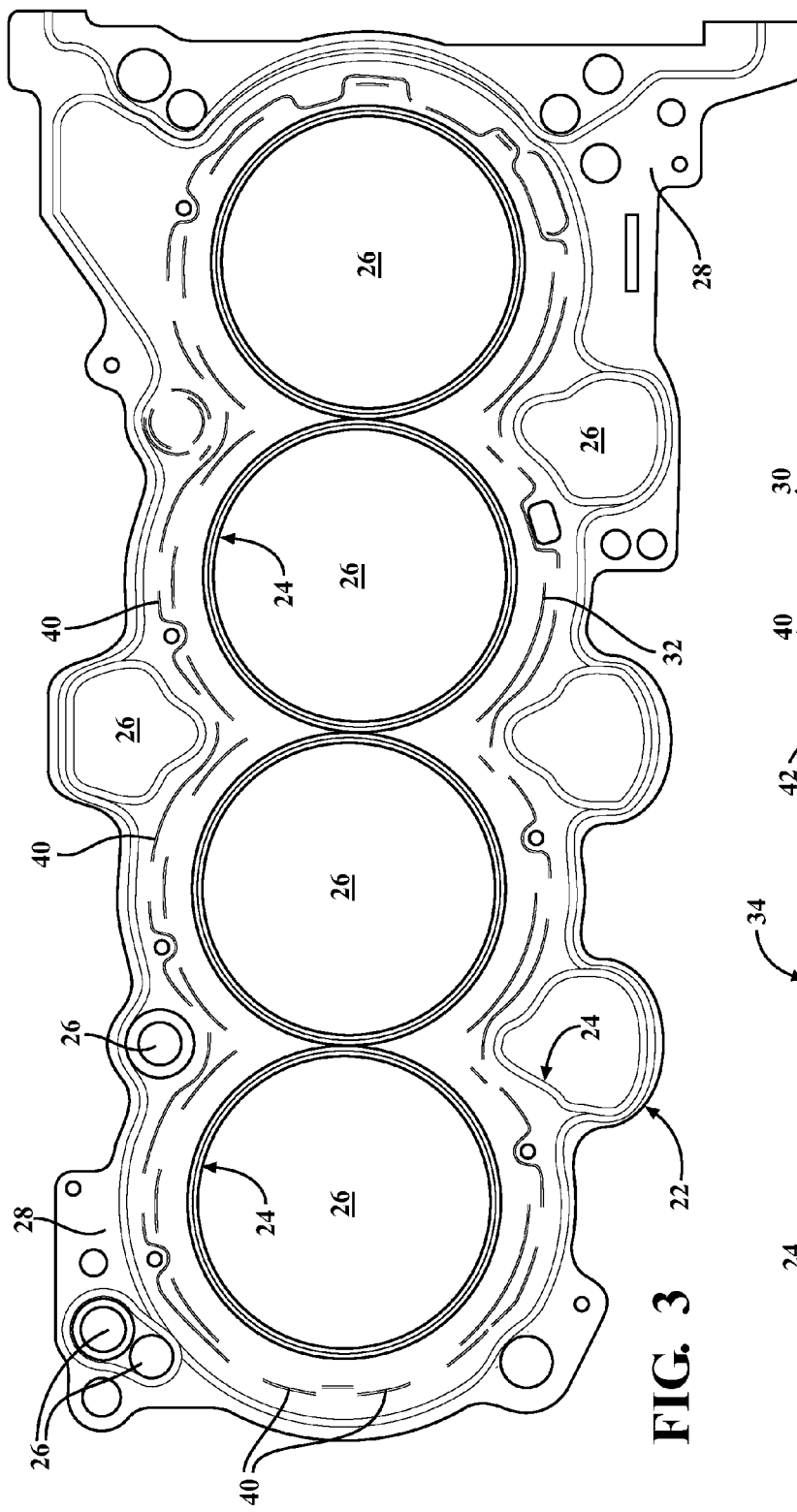
FIG. 3 is a top elevation view of the second gasket layer of another exemplary multi-layered gasket assembly and illustrates an intermittent weld pattern.

As shown in FIG. 1, the gasket assembly includes a plurality of metal gasket layers 20, 22 stacked in relation to one another. The gasket layers 20, 22 may be made of steel or other suitable metals. The plurality of metal gasket layers 20, 22 include at least a first gasket layer 20 and a second gasket layer 22 each having an inboard edge 24 defining at least one aperture 26 to be sealed. Referring to FIGS. 2 and 3, it should be appreciated that the aperture 26 generally corresponds to areas overlapping the placement of cylinder bores in the internal combustion engine but may also correspond to areas overlapping exhaust ports, cooling channels, threaded bores for receiving fasteners, and other voids in the cylinder head and/or engine block. Each gasket layer further includes an outboard region 28 radially spaced from the aperture 26.

Figure 4:
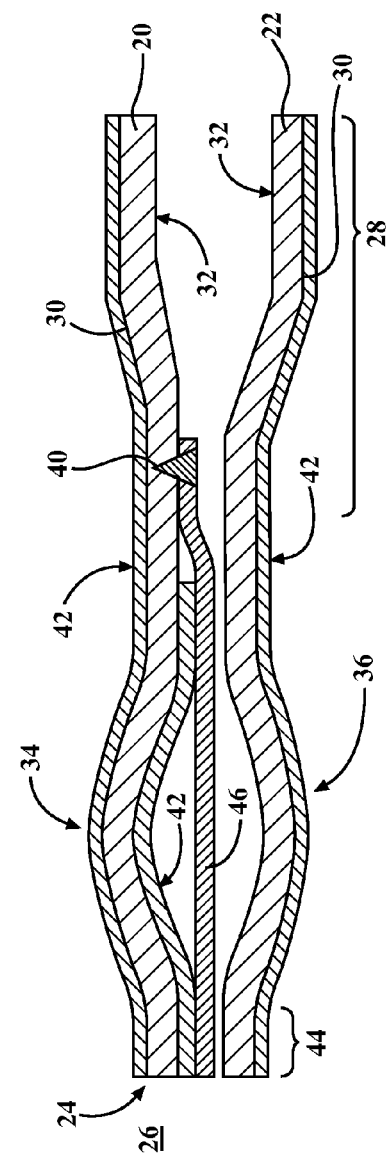
FIG. 4 is a fragmentary cross sectional view of the multi-layered gasket assembly.

Referring to FIGS. 1 and 4, the gasket layers 20, 22 each present an outer face 30 and an inner face 32. The outer face 30 of the first gasket layer 20 is configured to mate with the cylinder head of the internal combustion engine. In similar fashion, the outer face 30 of the second gasket layer 22 is configured to mate with the engine block of the internal combustion engine. Alternatively, the outer face 30 of the first gasket layer 20 may be configured to mate with an exhaust manifold of the internal combustion engine. At least one sealing bead 34, 36 is defined by at least one of the gasket layers 20, 22. The at least one sealing bead 34, 36 is disposed between the inboard edge 24 of the gasket layers 20, 22 and the outboard region 28 of the gasket layers 20, 22 and generally extends annularly about each aperture 26. The at least one sealing bead 34, 36 may include a first sealing bead 34 protruding outwardly from the outer face 30 of the first gasket layer 20 towards the cylinder head. The at least one sealing bead 34, 36 may further include a second sealing bead 36 radially aligned with the first sealing bead 34 and protruding outwardly from the outer face 30 of the second gasket layer 22 towards the engine block. It should be appreciated that other sealing bead 34, 36 arrangements may be utilized.

As shown in FIG. 4, a stopper layer 38 is disposed between the inner faces 32 of the gasket layers 20, 22. More specifically, the stopper layer 38 is attached to the outboard region 28 of the first gasket layer 20 at an attachment joint 40 such that the stopper layer 38 is positioned adjacent a portion of the inner face 32 of the first gasket layer 20. This attachment joint may take the form of a weld joint 40 but other attachment means could be used. The stopper layer 38 extends from the attachment joint 40 to the inboard edge 24 of the gasket layers 20, 22 such that the stopper layer 38 extends along and past the at least one sealing bead 34, 36 and terminates at the aperture 26. The stopper layer 38 functions to limit the deformation of the gasket layers 20, 22 thereby permitting stronger clamping forces between the cylinder head and the engine block or the exhaust manifold and the engine block.

As shown in FIG. 3, the attachment joint 40 attaching the stopper layer 38 to the first gasket layer 20 may extend along the outboard region 28 of the first gasket layer 20 in an intermittent pattern that generally circumscribes the apertures 26. It should be appreciated that this pattern may be an intermittent weld pattern. In accordance with the intermittent weld pattern, the welding is not continuous thereby avoiding the welding of unnecessary area which contributes little to the strength of the weld. It should be appreciated that the stopper layer 38 may be welded to the first gasket layer 20 using a laser welding process or other suitable welding processes including but not limited to spot welding.

Referring again to FIG. 4, a coating 42 of sealing material is applied to at least one surface of the first gasket layer 20 between the first gasket layer 20 and the stopper layer 38. More specifically, the coating 42 may be applied to a portion of the inner face 32 of the first gasket layer 20. In accordance with another aspect of the subject invention, the coating 42 may also be applied to the outer faces 30 of the gasket layers 20, 22. The coating 42 extends from the attachment joint 40 to the inboard edge 24 of the first gasket layer 20 to present a contact region 44 adjacent to and immediately surrounding the aperture 26. The contact region 44 is defined by an area where the first gasket layer 20 and the stopper layer 38 are in direct continuous contact with the coating 42 applied therebetween. In other words, the coating 42 applied to this area is sandwiched between the first gasket layer 20 and the stopper layer 38 such that no gaps, voids, or pockets existing between the coating 42 and the first gasket layer 20 and the stopper layer 38 disposed on either side thereof. It should be appreciated that the contact region 44 is free of gaps, voids, or pockets even when the gasket assembly is in its free uncompressed state. Accordingly, the arrangement of the contact region 44 prevents combustion gas leakage and metal to metal contact between the first gasket layer 20 and the stopper layer 38.

As shown in FIG. 4, the stopper layer 38 of the gasket assembly may further include a bend 46 adjacent the attachment joint 40 to facilitate the attachment of the stopper layer 38 to the first gasket layer 20. The bend 46 generally follows an ogee curve and allows a portion of the stopper layer 38 adjacent the attachment joint 40 to evenly contact the first gasket layer 20. As the term is understood in geometry, an ogee curve is shaped somewhat like the letter S and is comprised of a pair of oppositely curving arcs each extending from a common tangent point and terminating at a pair of parallel ends. It should be appreciated that the thickness of the coating 42 disposed between the first gasket layer 20 and the stopper layer 38 creates an angle between the first gasket layer 20 and a straight or unbent stopper layer 38. This angle reduces the integrity of the attachment joint 40. Where the stopper layer 38 is attached to the first gasket layer 20 by welding, the bend 46 increases the integrity and strength of the weld.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A gasket assembly comprising;
    a plurality of metal gasket layers including at least a first gasket layer and a second gasket layer each having an inboard edge circumscribing at least one aperture to be sealed and an outboard region radially spaced from said aperture,
    at least one sealing bead disposed along at least one of said gasket layers between said inboard edge and said outboard region,
    a stopper layer disposed between said gasket layers and attached to said outboard region of said first gasket layer at an attachment joint wherein said stopper layer extends from said attachment joint to said inboard edge of said gasket layers,
    a coating of sealing material applied between said first gasket layer and said stopper layer,
    said coating extending from said inboard edge of said first gasket layer to present a contact region adjacent to and immediately surrounding said aperture defined by said first gasket layer and said stopper layer being in direct continuous contact with said coating applied therebetween for preventing gas leakage between said first gasket layer and said stopper layer, and
    wherein said coating terminates between said at least one sealing bead and said attachment joint such that said stopper layer and said first gasket layer are in direct metal-to-metal contact at said attachment joint.

2. An assembly as set forth in claim 1 wherein said stopper layer includes a bend generally following an ogee curve adjacent said attachment joint to facilitate welding said stopper layer to said first gasket layer.

3. An assembly as set forth in claim 1 wherein said gasket layers each presents an outer face and an inner face.

4. An assembly as set forth in claim 3 wherein stopper layer is disposed between said inner faces of said gasket layers.

5. An assembly as set forth in claim 4 wherein said coating is applied to at least a portion of said inner face of said first gasket layer and extends from said inboard edge to said attachment joint.

6. An assembly as set forth in claim 5 wherein said coating is additionally applied to said outer faces of said gasket layers.

7. An assembly as set forth in claim 4 wherein said outer face of said first gasket layer mates with a cylinder head and the outer face of said second gasket layer mates with an engine block.

8. An assembly as set forth in claim 7 wherein said at least one sealing bead includes a first sealing bead protruding outwardly from said outer face of said first gasket layer towards the cylinder head and a second sealing bead radially aligned with said first sealing bead and protruding outwardly from said outer face of said second gasket layer towards the engine block.

9. An assembly as set forth in claim 4 wherein said outer face of said first gasket layer mates with an exhaust manifold and the outer face of said second gasket layer mates with an engine block.

10. An assembly as set forth in claim 9 wherein said at least one sealing bead includes a first sealing bead protruding outwardly from said outer face of said first gasket layer towards the exhaust manifold and a second sealing bead axially aligned with said first sealing bead and protruding outwardly from said outer face of said second gasket layer towards the engine block.

11. An assembly as set forth in claim 4 wherein said plurality of metal gasket layers are made of steel and are stacked in relation to one another.

12. An assembly as set forth in claim 1 wherein said attachment joint is a weld joint that extends along said outboard region of said first gasket layer in an intermittent weld pattern generally circumscribing said aperture.

* * * * *